March 23, 1954     J. E. WENTZ     2,672,696
TESTING APPARATUS FOR MOTOR VEHICLE OPERATORS
Filed Feb. 11, 1949     5 Sheets-Sheet 2

Inventor
JOHN E. WENTZ,
By
his Attorneys

March 23, 1954     J. E. WENTZ     2,672,696
TESTING APPARATUS FOR MOTOR VEHICLE OPERATORS
Filed Feb. 11, 1949     5 Sheets-Sheet 3
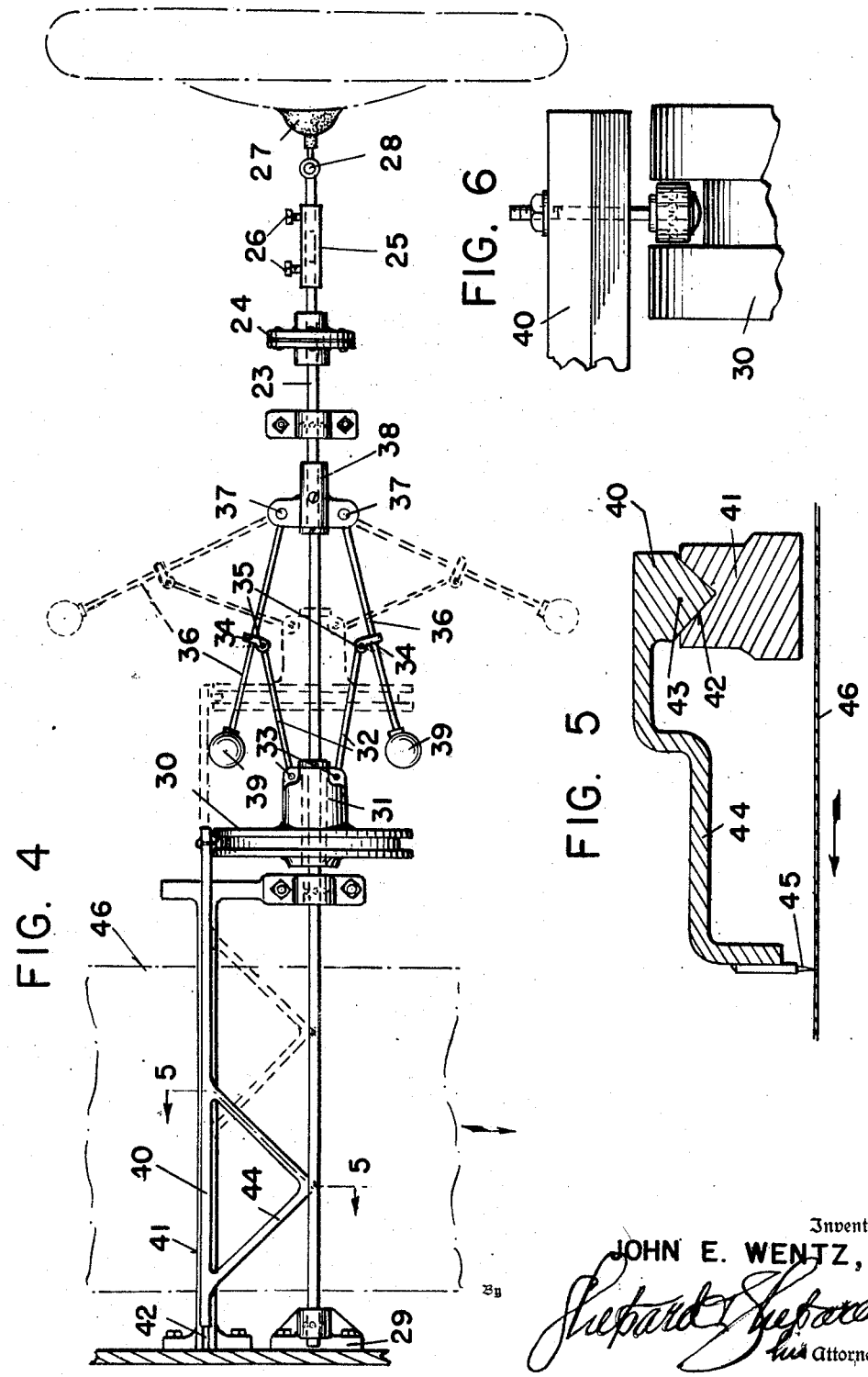
Inventor
JOHN E. WENTZ,
his Attorneys March 23, 1954
J. E. WENTZ
2,672,696
TESTING APPARATUS FOR MOTOR VEHICLE OPERATORS
Filed Feb. 11, 1949
5 Sheets-Sheet 4
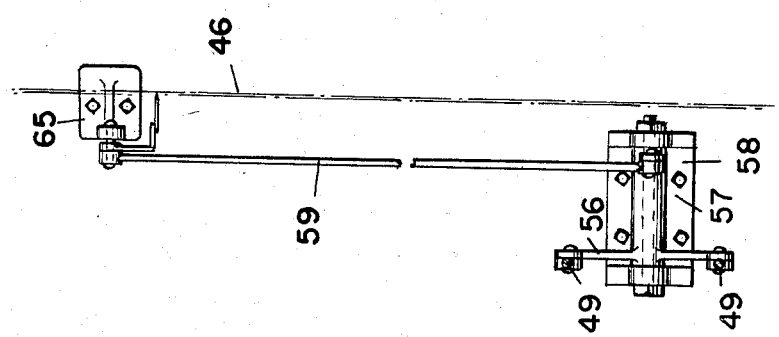
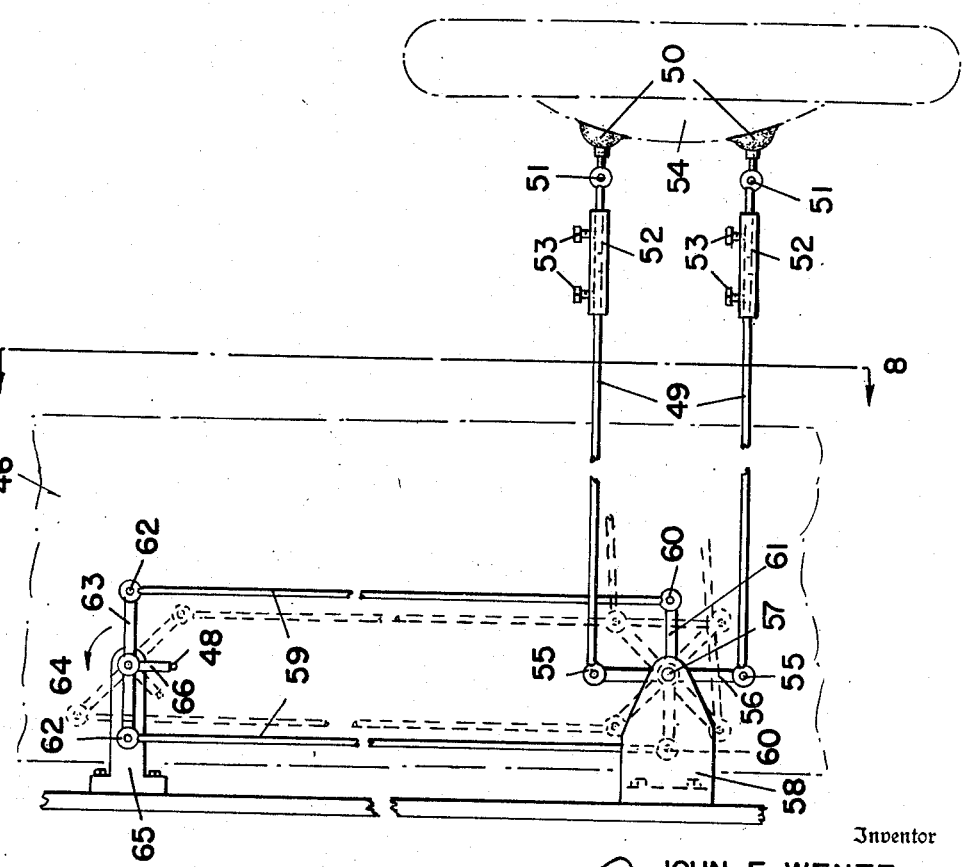
Inventor
JOHN E. WENTZ,
By Shepard & Shepard
his Attorneys March 23, 1954  J. E. WENTZ  2,672,696
TESTING APPARATUS FOR MOTOR VEHICLE OPERATORS
Filed Feb. 11, 1949  5 Sheets-Sheet 5
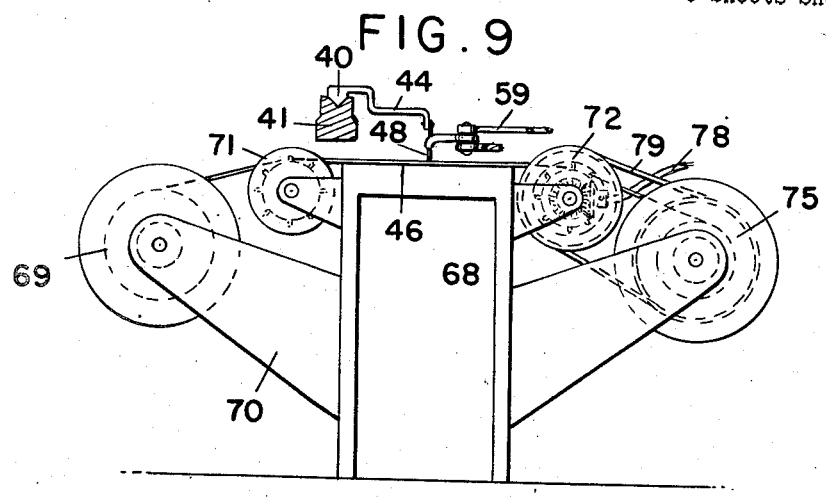
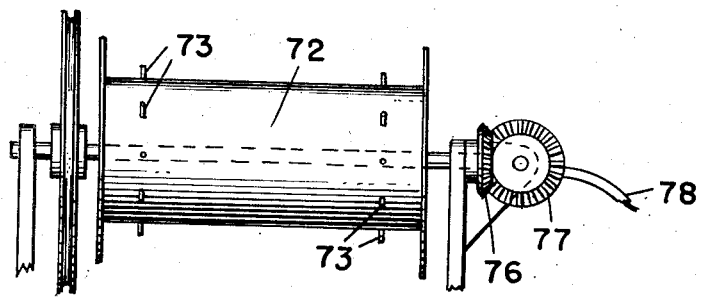
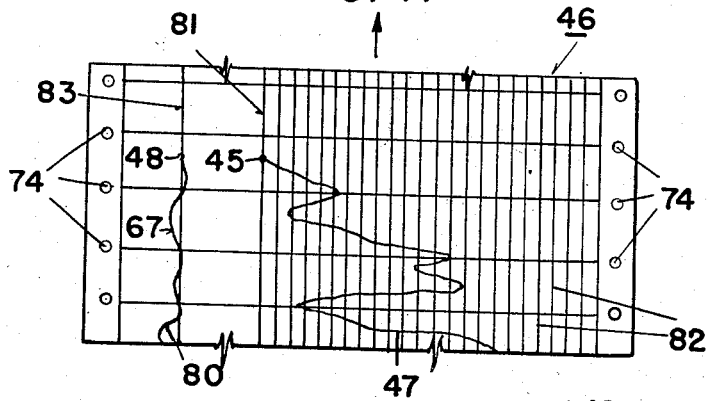
Inventor
JOHN E. WENTZ,
his Attorneys Patented Mar. 23, 1954

2,672,696

UNITED STATES PATENT OFFICE 2,672,696

TESTING APPARATUS FOR MOTOR VEHICLE OPERATORS

John E. Wentz, Lawrenceburg, Ind.

Application February 11, 1949, Serial No. 75,915

3 Claims. (Cl. 35—11)

This invention is an apparatus for testing the reactions of motor vehicle drivers or operators to road and traffic conditions and for making a record of such reactions.

It is an object of the invention to permit of the convenient driving of the vehicle onto and off of the apparatus by the operator being tested.

It is also an object of the invention to provide for the use of the vehicle of the operator undergoing the test or any other motor vehicle with which he is familiar.

Provision is made for actuating a stylus or marker by the rotary motion of the driven wheels of the vehicle in such a manner as to cause the marker to mark on a traveling record tape a graphic line indicating the speed of the vehicle throughout the period of the test.

Steering operations, according to the present invention, are marked on the traveling record tape by means associated with the steering wheels of the motor vehicle.

Provision is made to rotatably support the driven wheels of the vehicle so as to prevent travel of the vehicle during the test period, and to support the steering wheels so as to permit of steering movements thereof.

The invention involves the use of a moving picture film projected on a screen and depicting roadway and traffic conditions, such as grades, curves, intersections, accidents and near accidents, etc., and the operator under test is required to perform steering operations, speed change operations and stops to meet such road and traffic conditions as he sees them and in accordance with his judgment.

Also, the record tape is driven by the film feeding mechanism of the projector.

Figure 4 is an enlarged detail plan view of the means for marking speed indications on a record tape.

Figure 5 is an enlarged detail sectional view on the line 5—5 of Figure 4.

Figure 6 is an enlarged fragmentary elevation of a detail.

Figure 7 is a detail plan view of the means for marking steering operations on a record tape.

Figure 8 is a sectional elevation on the line 8—8 of Figure 7.

Figure 9 is a sectional elevation illustrating the mounting of the record tape of the apparatus.

Figure 10 is a detail elevation of the means for driving the record tape.

Figure 11 is a plan view of a portion of a record tape having steering and speed indications marked thereon by the apparatus of the present invention.

Figure 1:
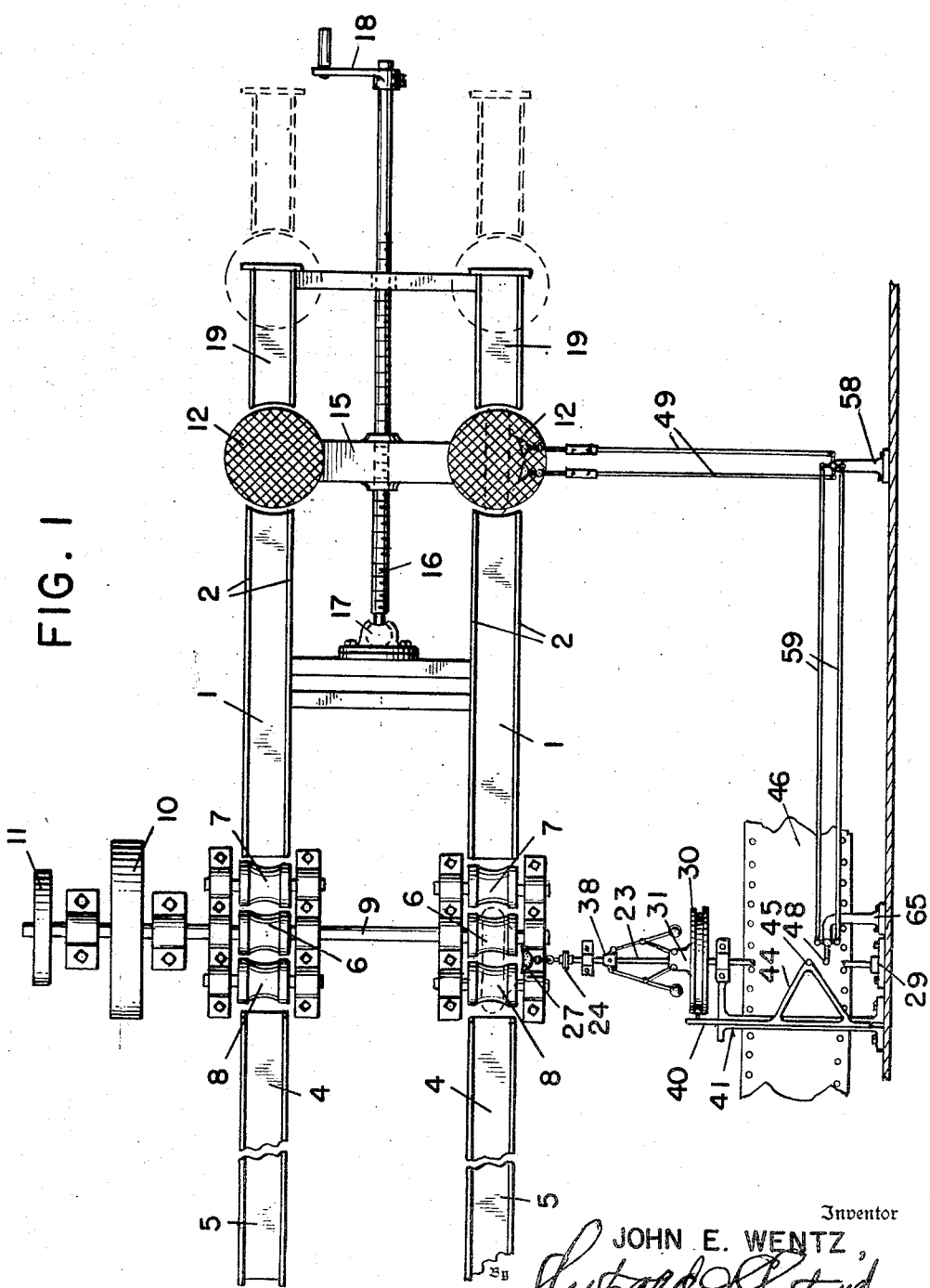
Figure 1 is a top plan view of an apparatus for testing the driving ability of an automobile driver.

The apparatus of the present invention is intended to support an automobile in a stationary condition and at the same time permit of the running of the engine for speed recording, and the turning of the steering wheels for steering recording.

For the support of an automobile there is a rack made up of a pair of spaced parallel and horizontal track members 1 preferably in the form of a channel iron having upstanding flanges 2 and supported in an elevated position in any suitable manner as by means of posts 3. Spaced at a suitable distance in rear of the track members 1 are other and similar horizontal track members 4, to the rear ends of which lead a ramp made up of inclined track members 5 leading from a floor or ground upwardly to the rear end of the track members 4 of the rack. The track members 4 and 5 are mounted on suitable posts as shown so that the track members 4 are in the same horizontal plane with the track members 1.

Between each pair of track members 1 and 4 there is a tread mill made up of an intermediate roller 6, a front roller 7 and a rear roller 8 each mounted to rotate on a horizontal axis with the upper portion of its periphery in substantially the same horizontal plane as that of the rack members 1 and 4. As best shown in Figure 1, these rollers are concaved or provided with aligned grooves which are intended to constitute a seat for the reception of one of the rear wheels of an automobile as will hereinafter appear. The two intermediate rollers 6 are carried by a horizontal shaft 9 so as to rotate therewith, the shaft being mounted in any suitable manner. One end of the shaft 9 projects laterally beyond the rack and carries a flywheel 10 and a brake wheel 11.

As thus far described, it will be understood that an automobile may be driven up the ramp portion 5 of the rack and onto the horizontal portion of the rack until its rear wheels are received between the intermediate roller 6 and either roller 7 or the roller 8. When in this position, the engine of the automobile may be put into operation so as to operate the rear or driving wheels of the automobile which will rotate between the intermediate rolls 6 and either of the rolls 7 and 8 without causing any forward or rear movement of the automobile, while at the same time the idle rollers will be rotated and the shaft 9 will be rotated so that the intermediate rolls 6 will be rotated simultaneously and at the same rate of speed and thus the drive wheels of the automobile may rotate without interference on the part of the present apparatus.

For the support of each front or steering wheel of the automobile, there is provided a horizontal turntable 12 located in alignment with the front end of one of the track members 1 and mounted to rotate on a vertical axis and provided with a depending stem 13 rotatably mounted in a casing or base 14. When the automobile is driven upon the rack of the present invention, it is positioned so that each steering wheel will rest upon one of the turntables, whereby the steering wheels are free to turn with the turntables upon manipulation of the steering wheel of the automobile. The turntables are so mounted that they may be moved forwardly away from the track members 1 to accommodate automobiles of different lengths. To provide for this movement or adjustment of the turntables, the supporting bases 14 thereof are connected together by means of a crosshead 15 through which extends a screw threaded rod or bar 16 having a screw threaded engagement with the crosshead. The rear end of the screw threaded rod is mounted in a thrust bearing 17 fixed in any suitable manner so as to support the rod 16 against endwise movement. Upon the front end of the rod 16 there is a crank handle 18 for use in turning the rod, whereby the crosshead 15 and the turntables carried thereby may be moved to selected positions spaced from the track members 1.

Located in front of the turntables and in horizontal alignment therewith are track members 19, similar to track members 1 for the purpose of receiving and supporting the steering wheels of an automobile should they travel past the turntables 12 preparatory to locating the steering wheels of the automobile on the turntables. For the purpose of selectively adjusting the positions of the turntables 12 and the track members 19, said parts may be mounted upon a truck 20 having wheels 21 traveling on a track 22 provided on the floor or the ground, such truck being movable back and forth by turning of the screw threaded rod 16.

Figure 2:
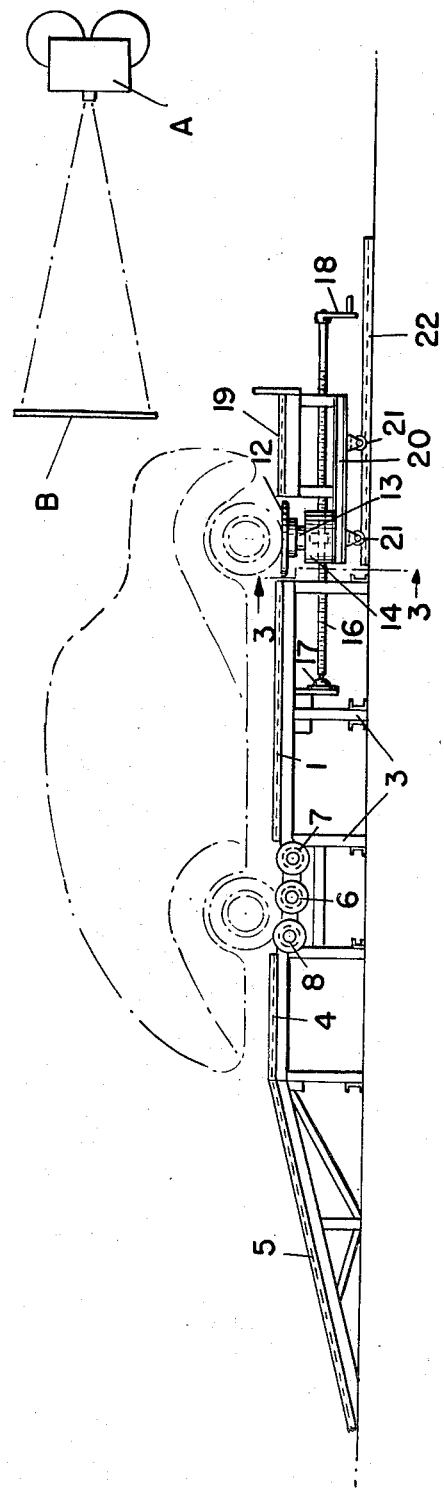
Figure 2 is a side elevation thereof.
Figure 3:
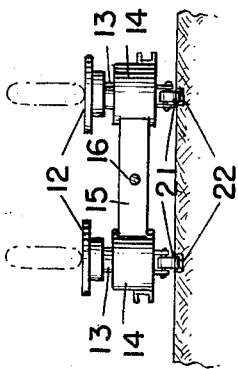
Figure 3 is a front elevation of the rack portion of the apparatus.

With an automobile supported on the rack in the position shown in Figure 2, rotating motion may be taken from one of the driving wheels of the automobile and employed for actuating a marker for marking a speed indicating line on a traveling tape in the manner now to be described.

At that side of the rack which is opposite the brake end of the shaft 9 there is a speed indicator shaft 23 disposed in a horizontal position and extending at substantially right angles to the rack. This shaft is divided into sections, two of which are connected by a flexible coupling 24. Between the coupling and the rack are two sections of the shaft which are connected in alignment by means of a sleeve 25 having set screws 26 whereby the shaft sections may be adjusted endwise within the sleeve and the effective length of the shaft thereby adjusted. The inner end of the shaft is provided with a vacuum cup 27 designed to be applied to the hub cap of the adjacent driving wheel of the automobile. The connection between the vacuum cup and the adjacent end of the speed indicator shaft may be in the form of a universal joint 28 so that the vacuum cup may accommodate itself to both the shaft and the automobile wheel. The shaft 23 is of a length such as will accommodate other parts of the apparatus, and its outer end is mounted in a bearing 29 which is supported in any suitable manner.

Mounted upon an intermediate portion of the shaft 23 so as to rotate therewith and slide thereon is a disk 30 having a hub 31, to which a pair of links 32 are pivotally connected as at 33. The outer end of each link 32 is provided with an eye or collar 34 hinged or pivoted as at 35 to the extremity of the link and slidably receiving an arm 36 having one end pivoted as at 37 to the shaft 23 through the instrumentality of a member 38 fixed to the shaft so as to rotate therewith and to be held against longitudinal movement thereon. The arms 36 extend from their pivotal connections 37 with the shaft towards the disk 30 and each of them is provided on its free end with a weight 39, whereby the arms and links operate like a governor for sliding the disk 30 along the shaft 23 under centrifugal action of the arms 36. The disk 30, together with the link 32 and arms 36, constitute speed responsive means responsive to the speed of rotation of the associated drive wheel of the automobile. This responsive means is utilized to actuate a marker for marking on a traveling record tape a continuous line representing a record of the speed of travel of the automobile. In carrying out this feature of the invention, an endwise movable slide bar 40 is disposed in parallelism with the shaft 23 and located between the disk 30 and the bearing 29 at the outer end of the shaft. A fixed slideway 41 is disposed below and in parallelism with the slide 40 and is provided in its upper face with a V-shaped groove 42 receiving the similarly shaped rib 43 extending from the under face of the slide 40. An arm or bracket 44 projects laterally from the slide 40 and carries a depending marker 45 disposed in cooperative marking relation with the upper surface of that portion 46 of a record tape underlying the slideway 41 and the speed recording shaft 23 and mounted to travel transversely of the direction of movement of the slide bar 40. As shown, the stylus or marker 45 is below and in vertical alignment with the shaft 23 which relation is desirable but not essential.

Referring to Figures 4 and 11, it will be understood that the combination and arrangement of the parts just described will result in an endwise reciprocating movement of the bar 40 under the influence of speed changes in the rotation of the automobile wheel with which the device is associated, thereby causing the marker 45 to reciprocate transversely of the record tape 46 traveling beneath the marker and at right angles to the direction of the reciprocating movement of the marker, whereby a record line 47 will be produced on the record tape, and this line will be a graphic record of the speed of the automobile as will hereinafter be explained.

The means for actuating a marker to mark on the record tape a graphic record of the steering operations is best shown in Figures 1, 7, 8 and 9, wherein 48 indicates the stylus or marker for producing the steering record line on the record tape, and this marker is actuated from one of the steering wheels of the automobile in the manner now to be described. A pair of parallel rods 49 are provided for transmitting steering movements from a steering wheel. Each rod is provided at one end with a vacuum cup 50 designed for application to the hub of a steering wheel at one side of the axis of rotation of the wheel, and is connected to the rod 49 by means of a suitable universal joint 51. Each rod 49 is divided into sections connected by a sleeve 52 having set screws whereby the effective length of the rod may be adjusted. Inasmuch as the rods 49 lie in the same horizontal plane and are connected to the hub cap 54 in diametrically opposite positions, steering movements of the automobile wheel will simultaneously move the rods 49 lengthwise in opposite directions.

The outer or free ends of the rods 49 are pivotally connected as at 55 to the opposite ends of a horizontal lever 56 fulcrumed as at 57 upon a suitable support such as a bracket 58 whereby the lever 56 will be rocked upon its fulcrum 57 by movement of the rods 49.

Disposed at substantially right angles to the rods 49 are other parallel rods 59 having the terminals thereof pivoted as at 60 to a horizontal lever 61 fulcrumed between its ends on the fulcrum 57 of the lever 56. The levers 56 and 61 are rigidly connected so as to move simultaneously, and, therefore, these levers may be in the form of a star wheel or bell-crank as will be understood. The other ends of the rods 49 are pivoted as at 62 to opposite ends of a horizontal lever 63 fulcrumed intermediate of its ends as at 64 upon a bracket or suitable support 65, so that when the rods 49 are moved in opposite directions, under steering movement of the steering wheel of the automobile, the levers 56 and 61 will be simultaneously rocked whereby the lever 63 will be rocked on its fulcrum 64 by the movement of the rods 59 endwise in opposite directions. The lever 63 carries a horizontal arm 66 extending from the fulcrum portion 64 so as to rock with the lever 63 and constitute a bell crank. The marker 48 is carried by and depends from the arm 66 and is disposed in cooperative relation with the upper face of the record tape 46 so as to mark a line thereon, such as indicated at 67 in Figure 11, corresponding to and indicative of the steering movement of the steering wheel of the automobile to which the apparatus is connected, as will hereinafter be explained.

The horizontal portion 46 of the record tape, as best shown in Figure 9, is mounted to travel across the top of a table or suitable support 68 with the supply portion wound upon a supply reel 69 disposed in a horizontal position and rotatably mounted in any suitable manner as by means of bearing brackets carried by the table, one such bracket being shown at 70. The record tape leads from the supply reel 69 to a guide drum 71 disposed between the supply reel 69 and the table top, and travels over the top of the drum, which top is in substantial alignment with the table top 68. After the tape travels across the table it engages a feed drum 72 driven in a manner as will be described. This drum has two annular series of fingers or projections 73 to engage perforations 74 in the opposite longitudinal edge portions of the record tape whereby the tape may be moved endwise and unwound from the supply drum 69. From the driving drum 72, the record tape leads to a storage reel 75 rotated in any manner so as to wind the marked portion of the tape upon the reel. As hereinbefore indicated, the present apparatus is intended to be used in conjunction with a motion picture projector A, which will be disposed in cooperative relation with the rack as indicated in Figure 2 of the drawings, and in accordance with the present invention, the mechanism for causing the record tape to travel from the supply reel to the storage reel is intended to be actuated from the film feeding mechanism of the projector. To accomplish this result, the feed drum 72 is provided with a miter gear 76 meshed with another miter gear 77, mounted in any suitable manner and associated with flexible shafting 78 extending to and associated with the film feeding mechanism of the projector so as to drive the drum 72 and consequently the record tape in synchronism with or in some predetermined ratio with respect to the travel of the film through the projector. The storage reel 75 is driven from the feed drum 72 in any suitable manner, as by means of a belt 79, whereby the storage reel will be driven at a proper rate of speed to satisfactorily wind the tape on the supply reel and also maintain the intermediate portion 46 of the tape in a taut and satisfactory condition for the proper operation of the markers 45 and 48 on the upper surface of the record tape which is supported by the table top 68.

As hereinbefore indicated, the present apparatus is intended to make a record of the reactions of the driver of an automobile associated with the present apparatus to the simulated driving conditions as displayed to said driver through the instrumentality of a picture film projected in the usual manner upon a screen such as indicated at B arranged to be conveniently viewed by the automobile operator or driver undergoing the test.

In using the apparatus, the turntables 12 are positioned with respect to the tread mill of the apparatus in accordance with the wheel base dimension of the automobile, and then the automobile is driven up the ramp 5 and onto the horizontal portion of the rack until the driven wheels of the automobile are seated upon the driven rolls 6 of the tread mill and either of the sets of idle rolls thereof, and the steering wheels of the automobile supported on the respective turntables 12. The projection apparatus is then set in operation so as to display on the screen B a moving picture of a roadway as it would appear to the automobile driver being tested if he was traveling along said roadway. The picture would include turns, grades, intersections, traffic conditions, accidents and near accidents, and it would be the duty of the driver under test to handle and control his automobile in accordance with the conditions appearing to him in the moving picture displayed on the screen.

The automobile engine will, of course, be in operation during the test and, therefore, the speed marker 45 will be actuated directly in accordance with the speed of rotation of the driven wheels of the automobile and will be moved back and forth transversely across the record tape 46 which is traveling at right angles to the reciprocating path of travel of the marker, thereby resulting in the production of a line, such as indicated at 47 in Figure 11, upon the record tape, such line indicating successively and continuously the rate of speed at which the automobile was traveling. At the same time the marker 48 will be actuated by the steerable movements of the steering wheels of the automobile so as to swing the marker 48 transversely across the record tape 46 and thereby produce a line 67 on the tape which line will indicate continuously and consecutively the steerable movements of the steering wheels.

For the purpose of reading the record, the tape is provided with time graduation lines 80 extending in parallelism transversely across the width of the record tape and spaced regularly to indicate some predetermined time intervals. Extending longitudinally of the tape is a heavy line or a colored line 81 disposed nearer one edge of the tape than the other edge, and with which line the speed marker 45 is set in registration preparatory to the use of the apparatus. After being thus set, the speed responsive mechanism 32 and 36 being at rest, any movement of the marker 45 occasioned by the speed responsive means will be to one side of the line 81. That portion of the record tape across which the speed marker operates is provided with a plurality of parallel lines 82 spaced to indicate rates of speed beginning with zero at the line 81 and increasing towards the right hand longitudinal edge of the record tape.

The marker 48 will be set to coincide with a line 83 extending longitudinally of the record tape at that side of the line 81 which is opposite the portion of the record tape which has the speed indicating lines 82, and thus it will be seen that as the marker 48 is moved laterally across the record tape under the effect of steering movements of the steerable wheels of the automobile, there will be produced the line 67 which will weave transversely of the tape and to opposite sides of the line 83.

Inasmuch as the speed line and the steering line extend in a general direction longitudinally of the record tape and across the time interval lines 80, which latter may be provided with indicia indicating time intervals made up of the sum of a plurality of the time intervals 80, the reaction of the driver under test may be readily determined by reference to the markings on the tape at the selected time intervals.

What I claim is:

1. In an apparatus for recording the driving reactions of the driver of a motor vehicle, a traveling record tape, a slide mounted above and across the tape for reciprocation transversely of the record tape, a speed marker carried by the slide in cooperative relation with the record tape, and speed marker actuating means including a rotary shaft having means for connection with a driven wheel of a motor vehicle, a disc mounted on the shaft to rotate therewith and slide thereon, a centrifugal speed responsive device mounted on the shaft and connected with the disc to reciprocate said disc on the shaft, and a tongue and groove connection between the disc and the slide for reciprocating the slide.

2. In an apparatus for recording the driving reactions of the driver of an automobile a traveling record tape, a steering marker pivotally mounted to swing transversely across the record tape in cooperative relation therewith, a bell crank, an operating connection between the pivotal marker and the bell crank, and a reciprocating rod connected to the bell crank and provided with means for connection with one of the steerable wheels of an automobile to reciprocate the said rod and thereby swing the marker on its pivotal support.

3. In an apparatus for recording the driving reactions of the driver of a motor vehicle, the combination of a traveling record tape, a slide mounted to reciprocate transversely of the tape, a speed marker carried by the slide in cooperative relation with the tape, a rotary shaft in parallelism with the path of the slide and provided with means for connection with a driven wheel of a motor vehicle, a disc rotatable with and slidable upon the shaft, a tongue and groove connection between the disc and slide, a centrifugal speed responsive device slidable upon the shaft and connected to the disc to rotate and reciprocate the disc upon the shaft, a pivotally supported steering marker in cooperative relation with the record tape, a bell crank, a reciprocatory rod connecting the bell crank and the marker for swinging the latter, and a reciprocatory rod connected to the bell crank and having means for connection with a steerable wheel of a motor vehicle for reciprocating said rod by steering movements of said wheel for swinging the bell crank and actuating the steering marker.

JOHN E. WENTZ.

References Cited in the file of this patent

UNITED STATES PATENTS

| Number | Name | Date |
| --- | --- | --- |
| 1,894,405 | Langbein | Jan. 17, 1933 |
| 1,928,505 | Schmelcher | Sept. 26, 1933 |
| 2,055,430 | Feragen | Sept. 22, 1936 |
| 2,091,154 | Matzner | Aug. 24, 1937 |
| 2,149,440 | Jackson | Mar. 7, 1939 |
| 2,269,444 | Durham | Jan. 13, 1942 |
| 2,353,213 | Bennett | July 11, 1944 |
| 2,414,976 | Redhed | Jan. 28, 1947 |
| 2,627,674 | Wilson | Feb. 10, 1953 |

FOREIGN PATENTS

| Number | Country | Date |
| --- | --- | --- |
| 747,274 | France | Mar. 28, 1933 |